United States Patent [19]

Strecher

[11] Patent Number: 5,207,580
[45] Date of Patent: May 4, 1993

[54] TAILORED HEALTH-RELATED BEHAVIOR CHANGE AND ADHERENCE AID SYSTEM

[76] Inventor: Victor J. Strecher, 1609 Hollywood St., Durham, N.C. 27701

[21] Appl. No.: 897,895

[22] Filed: Jun. 12, 1992

[51] Int. Cl.$^5$ .......................................... G09B 19/00
[52] U.S. Cl. .................................... 434/238; 40/107; 283/2
[58] Field of Search ................. 434/238, 236; 40/107; 283/2, 3, 4

[56] References Cited

U.S. PATENT DOCUMENTS

| | | | |
|---|---|---|---|
| 3,737,863 | 6/1973 | Fowland et al. | 340/172.5 |
| 4,686,624 | 8/1987 | Blum et al. | 364/415 |
| 4,776,799 | 10/1988 | Walsh | 434/238 |
| 4,796,182 | 1/1989 | Duboff | 364/413.29 |
| 4,853,854 | 8/1989 | Behar et al. | 364/413.01 |
| 4,878,175 | 10/1989 | Norden-Paul et al. | 364/413.01 |
| 4,924,389 | 5/1990 | Gerbaulet et al. | 364/413.29 |
| 4,951,197 | 8/1990 | Mellinger | 364/413.2 |
| 4,969,096 | 11/1990 | Rosen et al. | 364/413.02 |
| 4,975,842 | 12/1990 | Darrow et al. | 364/413.02 |
| 5,016,917 | 5/1991 | Dubner et al. | 283/4 |
| 5,019,974 | 5/1991 | Beckers | 364/413.02 |
| 5,033,561 | 7/1991 | Hettinger | 364/413.29 |
| 5,090,733 | 2/1992 | Bussiere | 283/2 |

Primary Examiner—John J. Wilson
Assistant Examiner—Jeffrey A. Smith
Attorney, Agent, or Firm—Olive & Olive

[57] ABSTRACT

A tailored health-related behavior change and adherence aid system. Answers to questions are used to select instruction statements for changing the behavior of each of the individuals. The statements are placed on spaces on one or more dated pages corresponding to dates prior to, on, or after a selected change date for an individual.

10 Claims, 6 Drawing Sheets

| JUNE SMOKING CESSATION CALENDAR FOR JANE SMITH |||||||
|---|---|---|---|---|---|---|
| SUN | MON | TUE | WED | THU | FRI | SAT |
|  | 1 | 2 | 3 GET READY TO QUIT: HABIT-BREAKING | 4 GET READY TO QUIT: HABIT-BREAKING | 5 GET READY TO QUIT: PEER PRESSURE | 6 GET READY TO QUIT: ANNOUNCE QUIT DATE |
| 7 GET READY TO QUIT: HABIT-BREAKING | 8 GET READY TO QUIT: FINAL PREPARATION | ⑨ QUIT DAY GET RID OF CIGARETTES | 10 STAYING OFF: AVOIDING WEIGHT GAIN, STRESS | 11 STAYING OFF: AVOIDING WEIGHT GAIN, STRESS | 12 STAYING OFF: AVOIDING WEIGHT GAIN, STRESS | 13 STAYING OFF: AVOIDING WEIGHT GAIN, STRESS |
| 14 STAYING OFF: AVOIDING WEIGHT GAIN, STRESS | 15 STAYING OFF: NICOTINE THERAPY CHECK-UP | 16 STAYING OFF: AVOIDING WEIGHT GAIN, STRESS | 17 STAYING OFF: AVOIDING PEER PRESSURE | 18 STAYING OFF: AVOIDING WEIGHT GAIN, STRESS | 19 STAYING OFF: AVOIDING WEIGHT GAIN, STRESS | 20 STAYING OFF: AVOIDING WEIGHT GAIN, STRESS |
| 21 STAYING OFF: AVOIDING PEER PRESSURE | 22 | 23 STAYING OFF: NICOTINE THERAPY CHECK-UP | 24 | 25 STAYING OFF: AVOIDING WEIGHT GAIN, STRESS | 26 | 27 STAYING OFF: AVOIDING WEIGHT GAIN, STRESS |
| 28 | 29 STAYING OFF: REMEMBER WHY YOU QUIT | 30 | | | | |

FIG. 1

JUNE

| SUN | MON | TUE | WED | THU | FRI | SAT |
|---|---|---|---|---|---|---|
|  | 1 | 2 | 3 | 4 | 5 | 6 |
|  |  |  | PREPARATION PHASE: INSTRUCTIONS 1,2,3 | PREPARATION PHASE: INSTRUCTIONS 1,2,4 | PREPARATION PHASE: INSTRUCTIONS 2,4 | PREPARATION PHASE: INSTRUCTIONS 4,5 |
| 7 | 8 | ⑨ | 10 | 11 | 12 | 13 |
| PREPARATION PHASE: INSTRUCTIONS 4,5,6 | PREPARATION PHASE: INSTRUCTIONS 5,6 | CHANGE PHASE: INSTRUCTIONS 1,2,3 | MAINTENANCE PHASE: INSTRUCTIONS 1,2,3 | MAINTENANCE PHASE: INSTRUCTIONS 1,2,3 | MAINTENANCE PHASE: INSTRUCTIONS 1,2,3 | MAINTENANCE PHASE: INSTRUCTIONS 3,4 |
| 14 | 15 | 16 | 17 | 18 | 19 | 20 |
| MAINTENANCE PHASE: INSTRUCTIONS 4,5,6 | MAINTENANCE PHASE: INSTRUCTIONS 5,6 | MAINTENANCE PHASE: INSTRUCTIONS 5,6,7 | MAINTENANCE PHASE: INSTRUCTIONS 5,6,7 | MAINTENANCE PHASE: INSTRUCTIONS 7,8 | MAINTENANCE PHASE: INSTRUCTIONS 7,8 | MAINTENANCE PHASE: INSTRUCTIONS 7,8 |
| 21 | 22 | 23 | 24 | 25 | 26 | 27 |
| MAINTENANCE PHASE: INSTRUCTIONS 8,9 |  | MAINTENANCE PHASE: INSTRUCTION 10 |  | MAINTENANCE PHASE: INSTRUCTION 10 |  | MAINTENANCE PHASE: INSTRUCTION 10 |
| 28 | 29 | 30 |  |  |  |  |
|  | MAINTENANCE PHASE: INSTRUCTION 10 |  |  |  |  |  |

PERSONAL AND DEMOGRAPHIC DATA:

- NAME: JANE SMITH
- AGE: 48
- GENDER: FEMALE

PATTERN AND HISTORY DATA

- NUMBER OF CIGARETTES SMOKED PER DAY: 40
- NUMBER OF PREVIOUS QUIT ATTEMPTS: 3
- NUMBER OF MINUTES FROM WAKING THAT FIRST CIGARETTE OF DAY IS SMOKED: 2

MOTIVES TO QUITTING:

- HEALTH REASONS? YES
- SELF-CONTROL? YES
- PRESSURE FROM FAMILY? YES
- PRESSURE FROM FRIENDS? NO
- COST OF CIGARETTES? YES
- QUIT DATE SET: JUNE 9, 1992

BARRIERS TO QUITTING:

- FEAR OF GAINING WEIGHT? YES
- FEAR OF FAILING? YES
- STRESS AND ANXIETY? YES
- PRESSURE FROM FAMILY? NO
- PRESSURE FROM FRIENDS? YES

JUNE
SMOKING CESSATION CALENDAR FOR JANE SMITH

| SUN | MON | TUE | WED | THU | FRI | SAT |
|---|---|---|---|---|---|---|
|  | 1 | 2 | 3 GET READY TO QUIT: HABIT-BREAKING | 4 GET READY TO QUIT: HABIT-BREAKING | 5 GET READY TO QUIT: PEER PRESSURE | 6 GET READY TO QUIT: ANNOUNCE QUIT DATE |
| 7 GET READY TO QUIT: HABIT-BREAKING | 8 GET READY TO QUIT: FINAL PREPARATION | ⑨ QUIT DAY GET RID OF CIGARETTES | 10 STAYING OFF: AVOIDING WEIGHT GAIN, STRESS | 11 STAYING OFF: AVOIDING WEIGHT GAIN, STRESS | 12 STAYING OFF: AVOIDING WEIGHT GAIN, STRESS | 13 STAYING OFF: AVOIDING WEIGHT GAIN, STRESS |
| 14 STAYING OFF: AVOIDING WEIGHT GAIN, STRESS | 15 STAYING OFF: NICOTINE THERAPY CHECK-UP | 16 STAYING OFF: AVOIDING WEIGHT GAIN, STRESS | 17 STAYING OFF: AVOIDING PEER PRESSURE | 18 STAYING OFF: AVOIDING WEIGHT GAIN, STRESS | 19 STAYING OFF: AVOIDING WEIGHT GAIN, STRESS | 20 STAYING OFF: AVOIDING WEIGHT GAIN, STRESS |
| 21 STAYING OFF: AVOIDING PEER PRESSURE | 22 | 23 STAYING OFF: NICOTINE THERAPY CHECK-UP | 24 | 25 STAYING OFF: AVOIDING WEIGHT GAIN, STRESS | 26 | 27 STAYING OFF: AVOIDING WEIGHT GAIN, STRESS |
| 28 | 29 STAYING OFF: REMEMBER WHY YOU QUIT | 30 |  |  |  |  |

TAILORED HEALTH-RELATED BEHAVIOR CHANGE AND ADHERENCE AID SYSTEM

BACKGROUND OF THE INVENTION

1. Field of the Invention

This invention relates to a method of changing undesired health-related behaviors and aiding adherence to desired health-related behaviors.

2. Description of the Related Art

Many studies have been done to determine how to help people to change their unhealthy behavior patterns and to adhere to healthy behavior patterns. As a result, books and articles have been written, for example, to encourage and help people lose weight, quit smoking, begin to exercise and the like. Because each person's motivation to change and adhere to behavior, and behavioral history as well as health risk and other personal factors are so individual, these mass-media behavior aids may not be helpful for everyone, and even if initially helpful, often do not continue to support and motivate the person as time passes.

Various programs do exist which provide group support for persons attempting to change and adhere to certain selected behaviors, such as Weight Watchers, and Alcoholics Anonymous. These programs usually require the person to attend meetings, and do not always provide support between meetings. They also do not tailor support for each particular individual.

Although consultation of a medical doctor can provide continued, personal health-related behavior change and adherence, such assistance is expensive and time-consuming and most people do not consult a doctor unless the situation is very serious.

It is therefore an object of this invention to provide a tailored health-related behavior change and adherence system which can be made available to persons desiring to change an unhealthy behavior and/or maintain a healthy behavior.

Other objects and advantages will be more fully apparent from the following disclosure and appended claims.

SUMMARY OF THE INVENTION

The invention provides a tailored preferably computer-tailored, health-related behavior change and adherence aid system. Answers to questions are used to select instruction statements for changing the behavior of each of the individuals. The selected statements are placed on spaces on one or more dated pages corresponding to dates prior to, on, or after a selected change for an individual.

Other aspects and features of the invention will be more fully apparent from the following disclosure and appended claims.

DETAILED DESCRIPTION OF THE INVENTION AND PREFERRED EMBODIMENTS

The invention provides a system for tailoring a health-related behavior change and behavior adherence program. Preferably this system is computer-tailored to increase efficiency and decrease cost.

The phrase "computer-tailored" in this case refers to a computer-based data entry, algorithmic analysis, and printing component to the process. Many potential interfaces may be used to collect the data, including computer, telephone, personal interview, and paper-and-pencil questionnaire data collection methods. Although the preferred embodiment of the invention utilizes computer-tailoring it is clear that tailoring is possible using other methods of gathering information, handling the analysis of the data and determining which feedback is appropriate or best for the person about which the information was gathered.

The phrase "health-related behavior" in this case refers to both positive and negative behaviors that may influence one's health. Examples of health-related behavior include cigarette smoking behavior, adherence to prescribed medications, alcohol consumption, illicit drug use, mammography screening behavior, exercise behavior and dietary practices. It is evident from these examples that a "negative" or "undesirable" behavior may be a very harmful behavior or may instead be simply the lack of a particular desirable behavior.

The phrase "change and adherence" in this case refers to health-related behavior changes and adherence to these changes which may result in health improvements. Examples of health improvements could include increased longevity or enhancement of quality of life.

The health-related behavior change and adherence aid process of the invention uses health risk and psychosocial information collected from the user of the process. This information is then preferably entered into a computer algorithm that uses the information to create tailored behavior change and adherence feedback. Health risk and psychological information collected include demographic information relevant to the health risk, history and patterns of the existing health-related behavior, motives to changing the health related behavior, a specific behavior change goal, specific dates for beginning phases of the health-related behavior change process and barriers to changing the health-related behavior.

Using these data, the computer algorithm produces feedback, for example, in the form of single month calendar sheets or a series of date book pages, that can be posted in the home, office, or other setting of the user. The monthly calendar or date book sheets preferably include at least the months relevant to the health-related behavior change phases of the user. These calendar or date book sheets can be provided to the user at the same time or sequentially over the actual months of the year.

Figure 1:
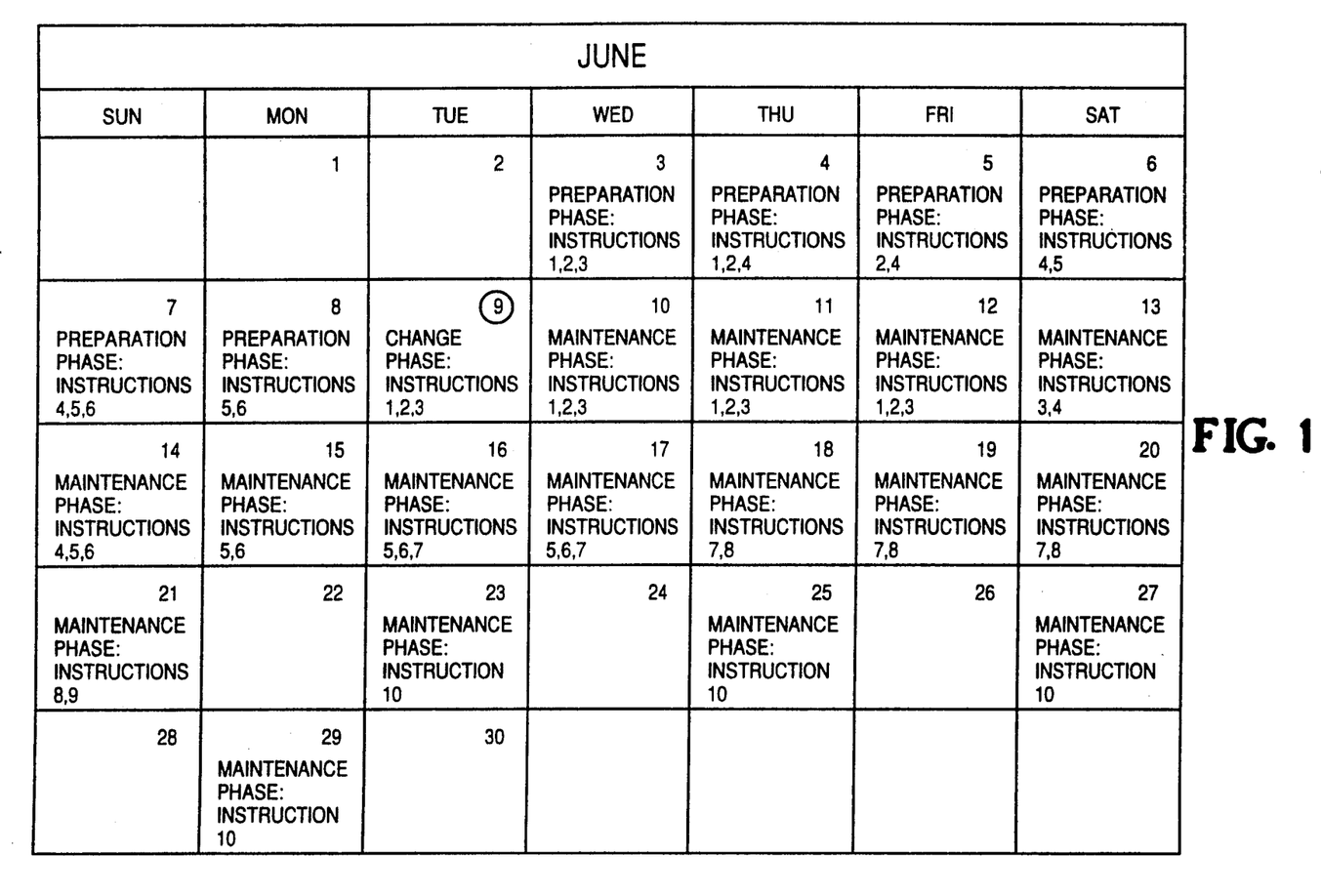
FIG. 1 is an example of a first month calendar format according to the invention.
Figure 5:
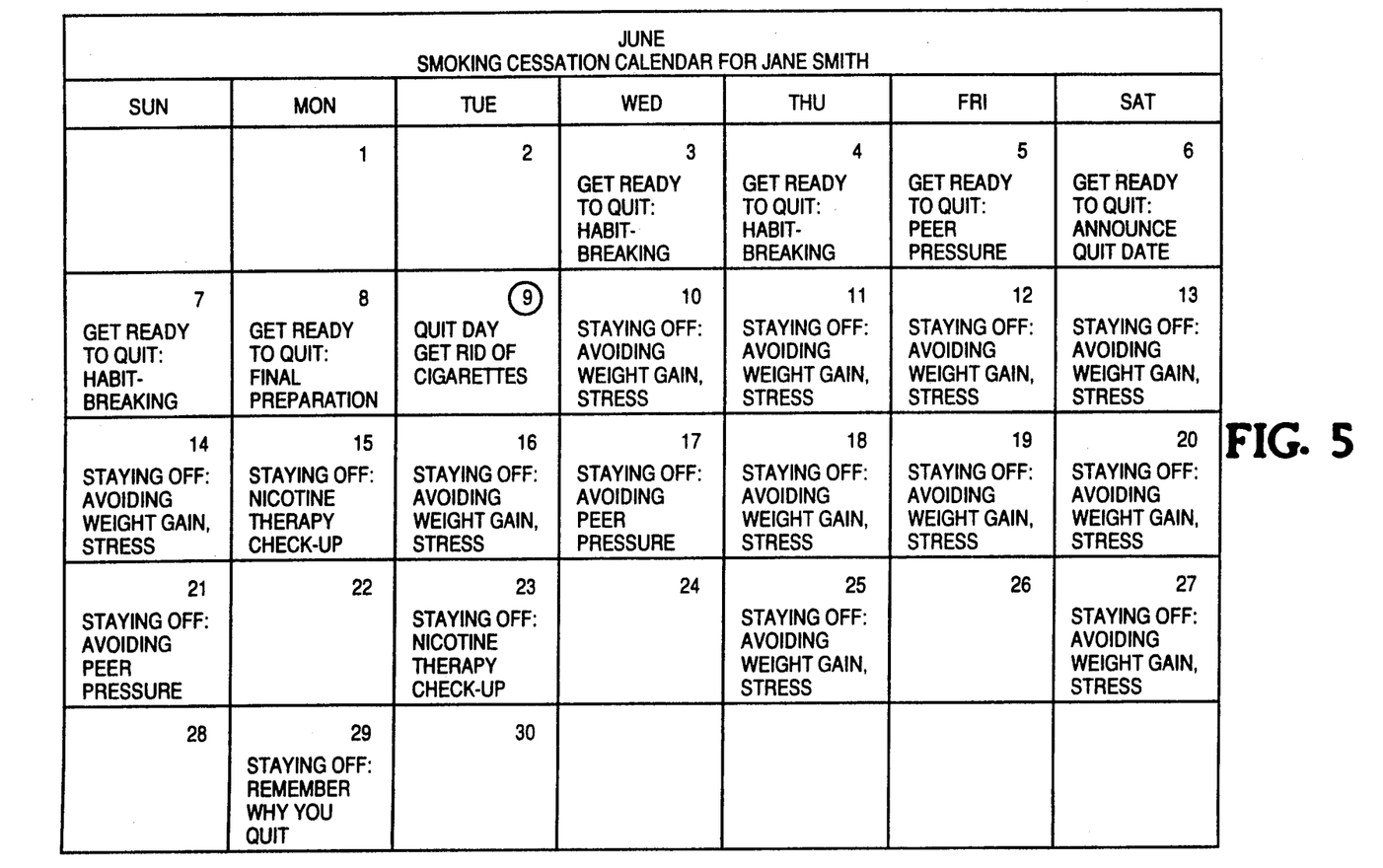
FIG. 5 show a tailored smoking cessation calendar for the first month for the person of FIG. 4.

The days of the monthly calendar or date book sheets contain specific instructions and advice associated with the history and patterns of the existing health-related behavior, motives to changing the health related behavior, the behavior change goal set, the specified dates for beginning the change, the phases of change, and barriers to changing the health-related behavior. An example of the calendar format is shown in FIGS. 1 and 5. These figures illustrate how tailored instructions and advice may be specified for the relevant days of a real calendar month. In a second embodiment, the information contained on the spaces of the calendar is placed in the spaces for the appropriate dates in a diary format, for example, a diary having all or part of a month, week, or day per page. As used herein the term "dated pages" refers to any such pages of either embodiment. The computer-based algorithm processes the data collected from the user to identify and print the instructions for each day on the desired page format.

Figure 4:
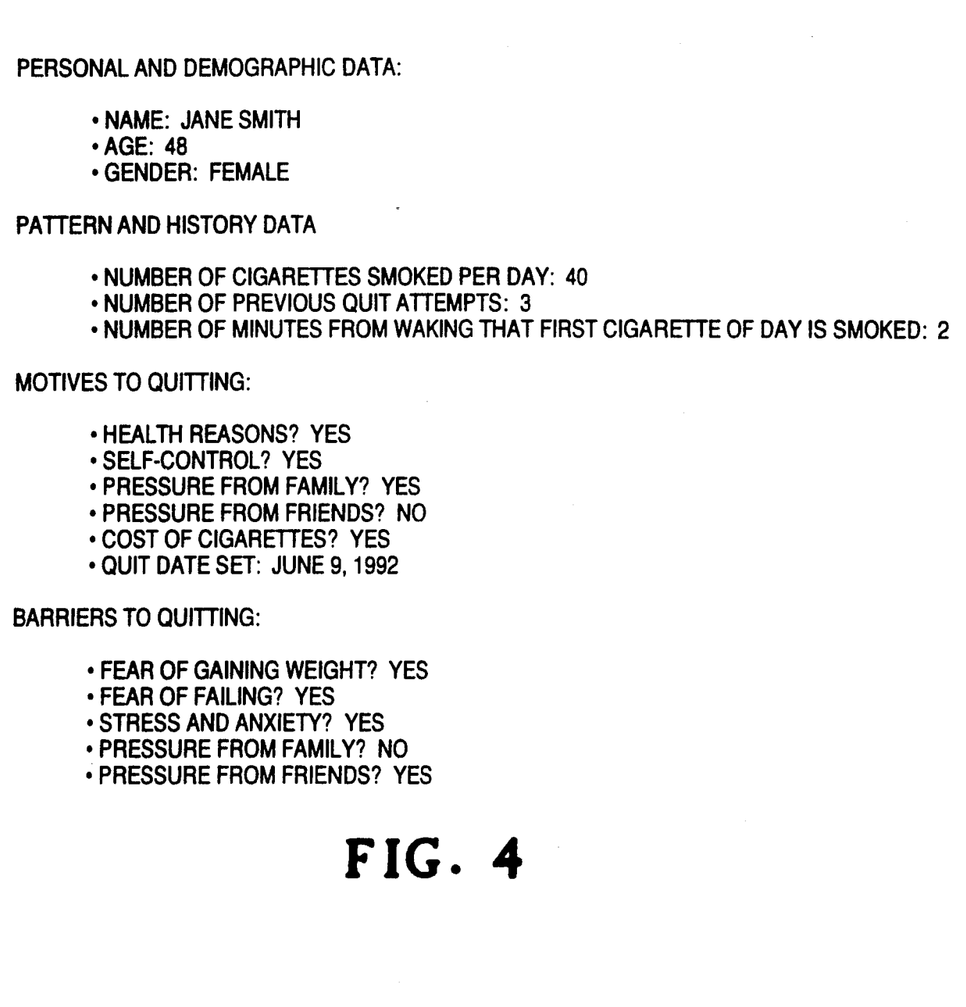
FIG. 4 provides an example of the type of information to be collected from a person, who is trying to quit smoking, to develop the tailored calendar of the invention.

As shown in FIG. 4, all questions collected are "closed-ended;" that is, they have specified response categories enabling a person or a computer algorithm to check for various combinations of variables and then create tailored instructions at specific times in the change process. The preferred questions asked all reflect previous research demonstrating relevance of the question to the health-related behavior. The primary categories in which information is collected, as discussed below, are demographics, history and patterns of existing health-related behavior, motives for changing the health-related behavior and barriers to changing the behavior.

The demographic and personal features of age and sex both have powerful influences on health, on health-related behaviors and on motives and barriers associated with change. The preferred computer algorithm thus creates different messages based on age and sex.

History, pattern and duration of the existing health-related behavior (e.g., number of years the user has smoked cigarettes), frequency of the behavior (e.g., number of cigarettes smoked per day), previous attempts to modify the behavior, and cues commonly initiating the behavior are related to propensity and ability to change the health-related behavior. These data are incorporated into the computer tailoring algorithm, which creates different messages based on these factors.

Motives to changing behavior are related to internal reasons (e.g., self-improvement, self-control, or improved health) or external reasons (e.g., spouse pressure, workplace policy). Health-related behavior change tends to be more frequent and long-lasting when motives are internal. When motives are external, the computer tailoring algorithm creates advice intended to generate internal motives to changing the health-related behavior.

Barriers to changing a health-related behavior can have psychological, physiological, social or environmental origins. For example, barriers to a smoker trying to quit could include fear of failure (psychological), nicotine dependency (physiological), fear of gaining weight (physiological and psychological), peer pressure to smoke (social), and high prevalence of smoking during break-times at work (social and environmental). The computer algorithm uses barrier information to create specific instructions for removing, diminishing, modifying or preparing for these barriers.

Figure 2:
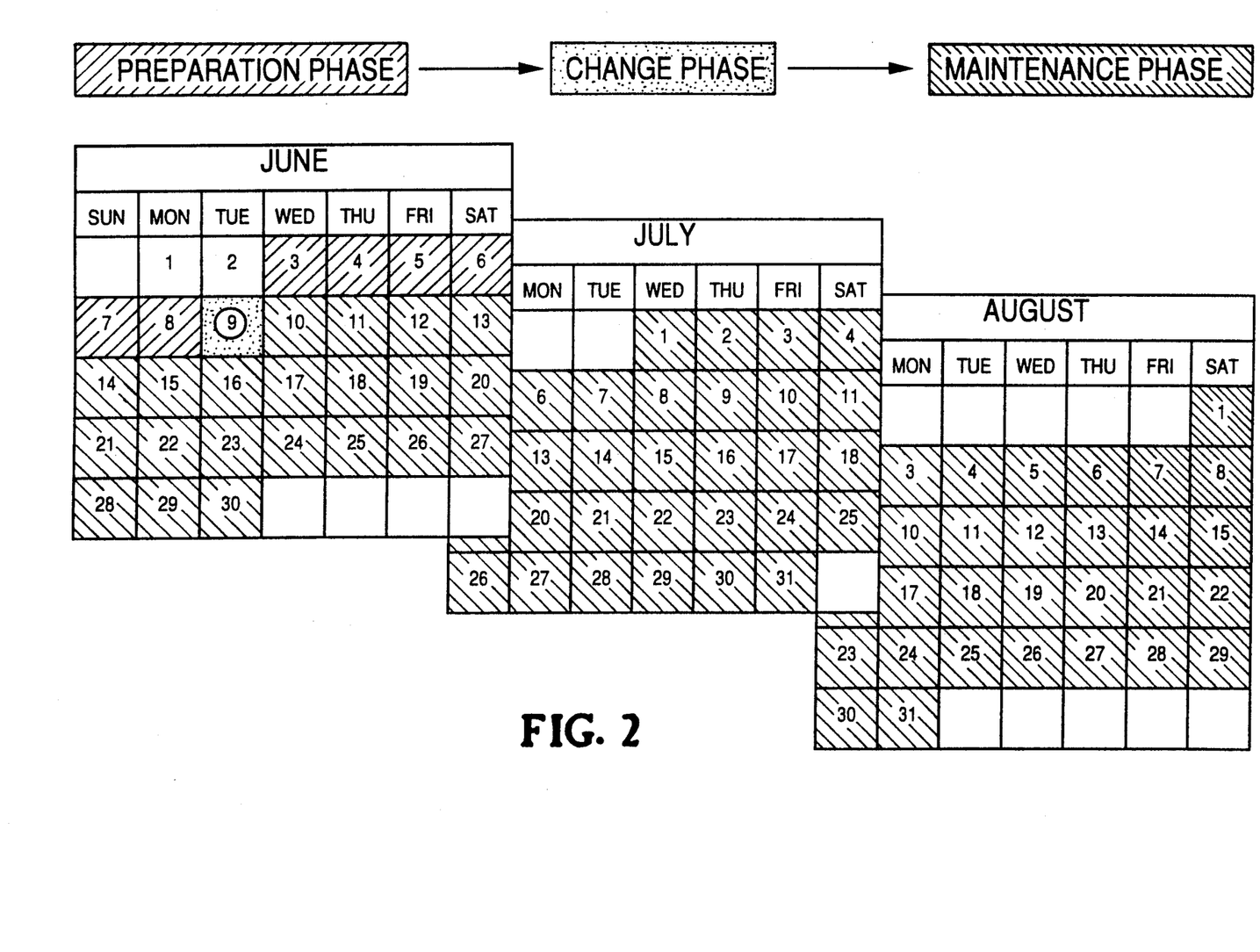
FIG. 2 shows the three phases of the invention on calendar pages.
Figure 3:
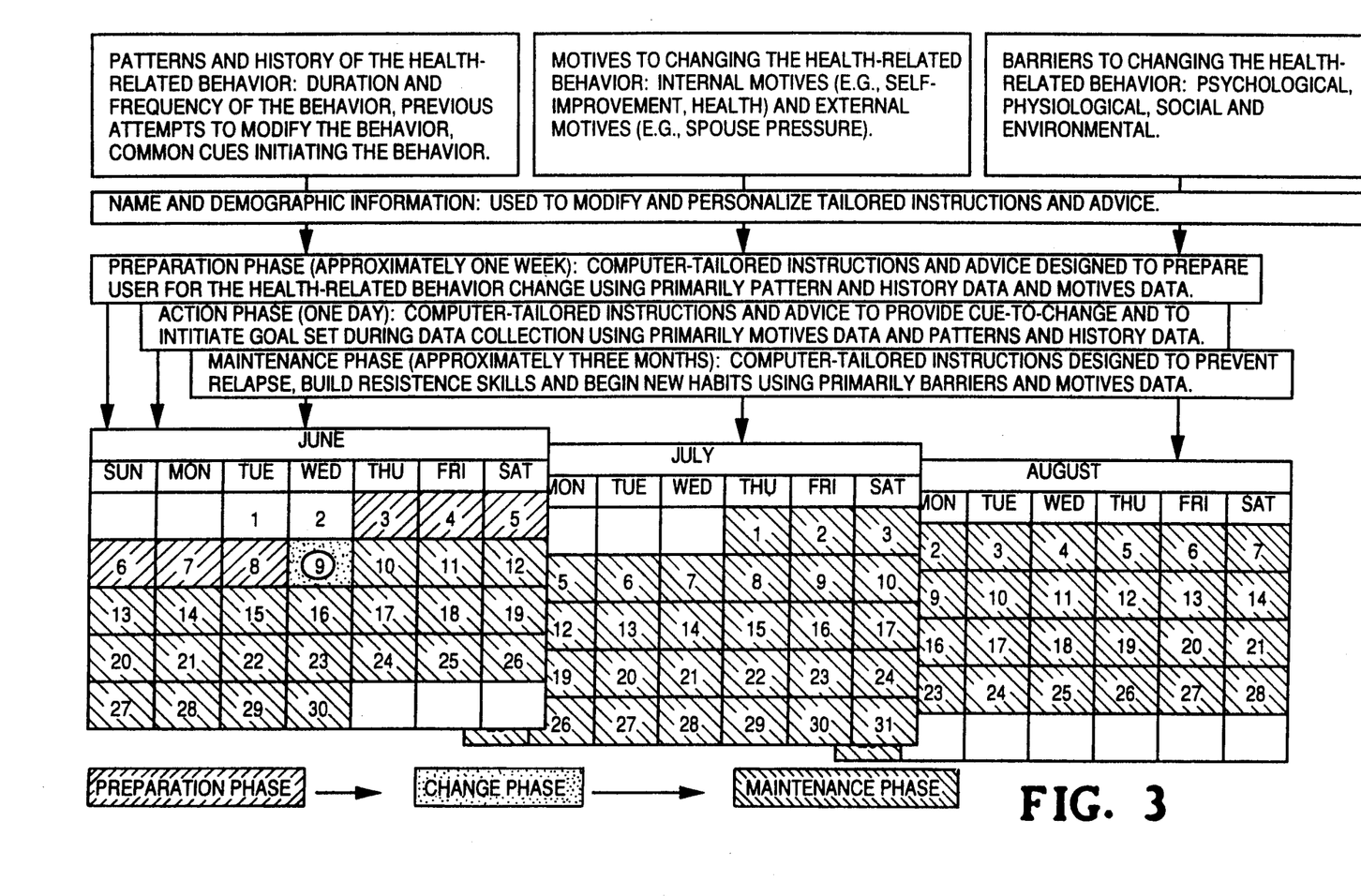
FIG. 3 is a flow chart of the method of the invention.

A key factor involved in the tailoring algorithm is the phase of health-related behavior change. In the preferred embodiment there are three phases of change for which different instructions and advice are created, preferably by computer algorithm: preparation, action and maintenance. These phases of change have been found in previous research to be distinct phases requiring different strategies to encourage movement to the next phase. The three phases are shown diagrammatically on three calendar pages in FIG. 2.

Preparation Phase

In the preferred embodiment of the invention the preparation phase lasts approximately one week, and initiates the health-related behavior change process. To create tailored advice during this stage, the computer algorithm primarily uses data collected about the pattern and history of the health-related behavior. For some health-related behaviors that may never have been performed in the past (e.g., exercise, adherence to a particular drug), pattern and history data will not be relevant and are not elicited or incorporated into the algorithm. However, for many behaviors such as cigarette smoking, excessive alcohol consumption and dietary behavior, pattern and history data are extremely relevant and are used in the algorithm. In particular, frequency and duration of the behavior, cues normally initiating the behavior, and previous attempts to modify the behavior are elicited and used to create instructions and advice for use during the preparation phase. During the preparation phase, motives cited by the user are also analyzed and incorporated into the algorithm, which provides instructions intended to internalize motives for changing.

The preparation phase may include certain behavioral change instructions prior to the main desired change, for example, if a person is trying to lose weight by increasing physical exercise prior to a change date to start dieting.

Action Phase

The action phase is brief, preferably one day, for most types of behavior change. The action phase is meant to provide a specific cue to initiating the health-related behavior, for example, quitting smoking or initiating a weight loss program. During the action phase, the algorithm creates a set of instructions related to the preparatory skills created during the preparation phase. The action phase is intended to fulfill the goal(s) set and reported during data collection. The action phase may comprise multiple or staged changes, for example, a series of changes for a dieter, each of which changes includes an additional or different restriction on intake and possibly, the addition of a change in exercise behavior on the same or different days(s) as the dietary changes.

Maintenance Phase

For most behavior changes, the maintenance phase lasts approximately three months, gradually diminishing in intensity over this time period. The algorithm primarily uses barriers and motives data to create specific relapse prevention skills. Barriers are specifically addressed in this phase through messages that an expert counselor might provide in response to a barrier cited by a client. For example, the computer program contains specific instructions to cigarette smokers in avoiding weight gain after smoking cessation. The algorithm determines whether fear of gaining weight was cited by the smoker during date collection. If weight gain is perceived as a barrier, specific instructions throughout the maintenance phase are provided to assist the user. The algorithm also uses data regarding previous attempts at change. Specifically, users who have made previous, failed attempts to change receive advice intended to encourage learning from these attempts, and utilization of this knowledge in the current behavior change attempt. Instructions regarding internal motives for making the health-related behavior change are repeated throughout the maintenance phase.

Although the preferred embodiment of the invention comprises dated pages having instructions for all three phases, it is clear that also included in the scope of the invention are dated pages only having the maintenance phase dates and instructions for a person who has already changed the behavior but wishes to have help maintaining the behavior.

The features of the present invention will be more clearly understood and by reference to a particular example of questions and answers and resultant dated pages with information and/or instructions tailored for one person trying to quit smoking. Information is collected from a smoker (called herein Jane Smith) who is trying to quit. The information may be collected in a number of ways, included paper-and-pencil questionnaire, face-to-face interview, direct computer entry or touch-tone telephone to computer entry. Typical questions and information gathered from Jane Smith are shown in FIG. 4.

The information is then entered into the computer (if not entered directly by the smoker). The computer applies algorithmically-based rules to determine messages or information to be placed in the calendar. The type of messages and their content are determined by the particular individual who is trying to quit smoking.

A set of calendar months is then printed by the computer, for example, as shown in the shortened one-month version in FIG. 5. The calendar months indicate a preparatory phase, focusing Jane Smith on habitual aspects of her smoking, assuaging her fear of failure, preparing her for pressure to smoke from friends and letting both friends and relatives know the date when she will be quitting smoking, termed herein the change date.

A change date of June 9th is indicated on the calendar, with specific instructions, including getting rid of smoking-related paraphernalia. Moreover, since Jane Smith's responses to questions asking the number of cigarettes smoked per day and the number of minutes to first cigarette of day indicate nicotine dependency, the change date is an appropriate time to recommend initiation of nicotine replacement therapy, if this therapy has been prescribed for her by a qualified health professional. The maintenance phase focuses on Jane Smith's barriers to quitting, including fear of gaining weight, stress, and pressure from friends. This phase also reminds Jane Smith of her initial motives to quitting, including health improvements, increased self-control, and savings from money normally spent on cigarettes. Finally, Jane Smith is provided regular advice regarding use of the nicotine replacement therapy she received from her physician.

The tailoring of the invention becomes more evident with an abbreviated second example. If a second smoker is desiring to quit who, for example, does not fear gaining weight, the instructions would be correspondingly altered. In other words each type of answer singly, or in combination with other answers, would determine the particular instructions to be placed on the calendar.

Although the invention herein has been described in association with a calendar having one page per month, it is clear that calendars having multiple or partial months per page or one page per day, e.g., diaries, or other segments of time may be used. It is primarily important that the space allotted to each date is big enough to hold the instruction(s) for that date and that enough dates are present for all three phases of behavior change and adherence.

Figure 6:
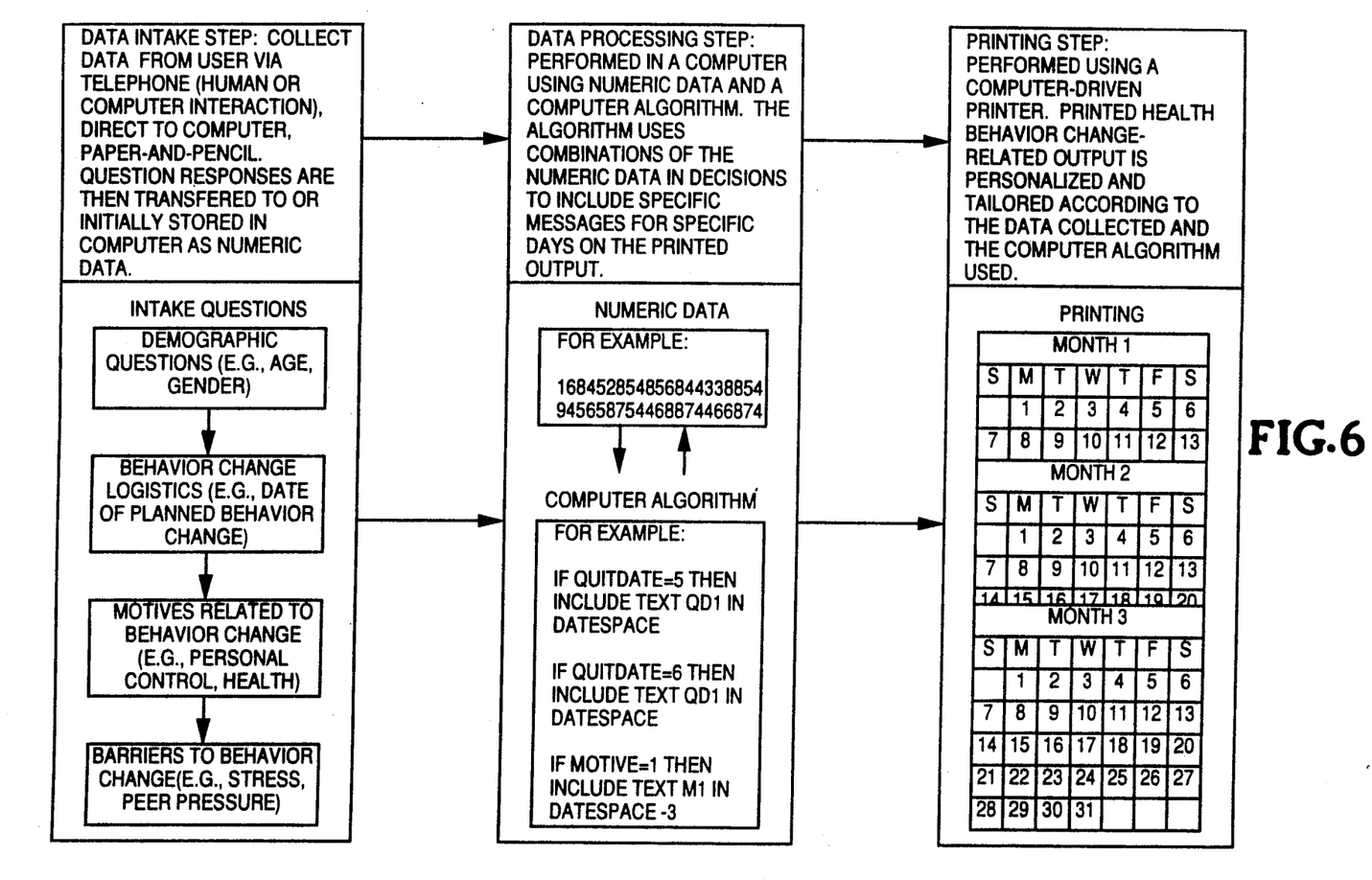
FIG. 6 is a flow chart of a computer-tailored method of the invention.

Preferably the method of the invention utilizes a computer to perform some or all of the steps, including obtaining answers from the person desiring to change behavior, matching the answers with instruction statements, and preparing dated pages according to the invention. A preferred sequence of steps in the computer-tailored invention is shown in FIG. 6.

While the invention has been described with references to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A method of tailoring aid to an individual to change an undesirable health-related behavior of said individual to a selected desirable health-related behavior and to maintain said selected desirable health-related behavior, comprising:
    (a) obtaining answers from said individual to questions related to topics selected from the group consisting of:
        (i) characteristics of said individual's undesirable health-related behavior;
        (ii) factors motivating said individual to change said undesirable behavior; and
        (iii) factors acting as barriers to changing said undesirable behavior;
    (b) providing a plurality of instruction statements, said plurality comprising preparation phase statements, change phase statements and maintenance phase statements, each of said statements being tailored to possible answers to said questions;
    (c) determining a change date for changing said individual's undesirable behavior;
    (d) providing one or more dated pages comprising a space for said change date and having dated spaces for preparation dates prior to said change date and for maintenance dates after said change date;
    (e) marking said change date in the space for said change date and placing one or more change phase statements in said space for said change date;
    (f) placing one or more preparation phase statements in spaces for selected preparation dates which occur prior to said change date;
    (g) placing one or more maintenance phase statements in spaces for selected maintenance dates which occur after said change date; and
    (h) providing said dated pages to said individual before said preparation dates.

2. A method according to claim 1, wherein said undesirable health-related behavior is selected from the group consisting of cigarette smoking; undesirable intake of a particular substance or substances and lack of physical exercise.

3. A method according to claim 1, wherein said questions further comprise questions soliciting answers containing demographic and personal data.

4. A method according to claim 1, wherein preparation phase statements are placed in a space for a date a week prior to the change date and maintenance phase statements are placed in a space for dates occurring at least two months after said change date.

5. A method according to claim 1, wherein said dated pages are calendar pages.

6. A method according to claim 1, wherein said dated pages are diary pages.

7. A method according to claim 1, wherein at least one of the steps (a)–(h) is accomplished using a computer.

8. A method of tailoring aid to an individual desiring to change behavior, comprising:
   (a) collecting behavior data from said individual utilizing intake questions and placing said data on a computer;
   (b) processing said data on the computer and producing specific behavioral change messages for specific days, said messages tailored to said behavioral data; and
   (c) printing said specific messages on dated pages.

9. A method of tailoring aid to an individual to change an undesirable health-related behavior of said individual to a selected desirable health-related behavior and to maintain said selected desirable health-related behavior, comprising:
   (a) obtaining answers from said individual to questions related to topics selected from the group consisting of:
      (i) characteristics of said individual's undesirable health-related behavior; and
      (ii) factors acting as barriers to changing said undesirable behavior;
   (b) providing a plurality of instruction statements comprising maintenance phase statements, each of said statements being tailored to possible answers to said questions;
   (c) providing one or more dated pages having dated spaces for maintenance dates;
   (d) placing one or more maintenance phase statements in spaces for selected maintenance dates; and
   (e) providing said dated pages to said individual.

10. A behavioral aid provided for an individual to change an undesirable health-related behavior to a selected desirable health-related behavior and to maintain said selected desirable health-related behavior, comprising one or more dated pages, said pages comprising:
    (a) a dated space having a change date labelled thereon for changing said undesirable behavior, and containing one or more change phase statements, said dated space further containing indicia means labelled thereon for identifying said change date as a member of a change phase group;
    (b) first dated spaces each having preparation dates labelled thereon which are chronologically prior to said change date and each containing one or more preparation phase statement, each said first dated spaces further containing indicia means labelled respectively thereon for identifying each of said first dated spaces as a member of a preparation phase group; and
    (c) second dated spaces each having maintenance dates labelled thereon which are chronologically after said change date and each containing one or more maintenance phase statement, each said second dated spaces further containing indicia means labelled respectively thereon for identifying each of said second dated spaces as a member of a maintenance phase group, wherein said change phase statements, preparation phase statements and maintenance phase statements are tailored to answers given by said individual to behavior-related questions.

* * * * *